(12) United States Patent
Imaizumi et al.

(10) Patent No.: US 12,083,774 B2
(45) Date of Patent: Sep. 10, 2024

(54) BARRIER FILM AND BARRIER PACKAGING MATERIAL

(71) Applicant: TOPPAN INC., Tokyo (JP)

(72) Inventors: Shukiko Imaizumi, Taito-ku (JP); Tomokazu Murase, Griffin, GA (US)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 17/633,538

(22) PCT Filed: Jul. 2, 2020

(86) PCT No.: PCT/JP2020/026048
§ 371 (c)(1),
(2) Date: Feb. 7, 2022

(87) PCT Pub. No.: WO2021/029156
PCT Pub. Date: Feb. 18, 2021

(65) Prior Publication Data
US 2022/0288907 A1    Sep. 15, 2022

(51) Int. Cl.
*B32B 27/32* (2006.01)
*B32B 33/00* (2006.01)

(52) U.S. Cl.
CPC .............. *B32B 27/32* (2013.01); *B32B 33/00* (2013.01); *B32B 2250/03* (2013.01);
(Continued)

(58) Field of Classification Search
CPC ..... B32B 27/32; B32B 33/00; B32B 2250/03; B32B 2255/20; B32B 2307/31; B32B 2553/00
See application file for complete search history.

(56) References Cited

U.S. PATENT DOCUMENTS 10,066,093 B2    9/2018 Aubee
2011/0045251 A1   2/2011 Kazeto et al.
(Continued)

FOREIGN PATENT DOCUMENTS

CN    109438803 A    3/2019
JP    60-230851 A    11/1985
(Continued)

OTHER PUBLICATIONS

English machine translation for JP2017-222151A (Year: 2017).*

(Continued)

*Primary Examiner* — Michael C Miggins
(74) *Attorney, Agent, or Firm* — Oblon, McClelland, Maier & Neustadt, L.L.P.

(57) ABSTRACT

A barrier film according to the present disclosure has a base material film including a polyolefin-based resin; an inorganic oxide layer provided on one surface of the base material film; and a deformation-withstanding barrier coat layer provided on the inorganic oxide layer to be in contact therewith, wherein the deformation-withstanding barrier coat layer includes a hydroxyl group-containing polymer compound and water-swellable mica, and when the total mass of the deformation-withstanding barrier coat layer is taken as 100 parts by mass, the content of the water-swellable mica in the deformation-withstanding barrier coat layer is 5 parts by mass to 35 parts by mass.

20 Claims, 6 Drawing Sheets

(52) U.S. Cl.
CPC ....... *B32B 2255/20* (2013.01); *B32B 2307/31* (2013.01); *B32B 2553/00* (2013.01)

(56) References Cited

U.S. PATENT DOCUMENTS

| | | |
|---|---|---|
| 2016/0039181 A1 | 2/2016 | Mazzola et al. |
| 2018/0186123 A1 | 7/2018 | Jacques et al. |
| 2019/0126601 A1 | 5/2019 | Murase et al. |

FOREIGN PATENT DOCUMENTS

| | | |
|---|---|---|
| JP | H07-251475 A | 10/1995 |
| JP | 11-334018 A | 12/1999 |
| JP | 2000-254994 A | 9/2000 |
| JP | 2002-030160 A | 1/2002 |
| JP | 2002-030161 A | 1/2002 |
| JP | 2004-276301 A | 10/2004 |
| JP | 2008-44260 A | 2/2008 |
| JP | 2017-222151 A | 12/2017 |
| JP | 2018-149779 A | 9/2018 |
| WO | WO 2009/123200 A1 | 10/2009 |
| WO | WO 2014/175277 A1 | 10/2014 |
| WO | WO 2018/187438 A | 10/2018 |
| WO | WO 2019/088265 A1 | 5/2019 |

OTHER PUBLICATIONS

International Search Report issued Sep. 1, 2020 in PCT/JP2020/026048, 5 pages.
English translation of International Preliminary Report on Patentability and Written Opinion issued Feb. 17, 2022 in PCT/JP2020/026048, 7 pages.
Extended European Search Report issued Jul. 14, 2023 in European Patent Application No. 20853053.5, 11 pages.

\* cited by examiner ent application is a 35 U.S.C. § 371 national stage
BARRIER FILM AND BARRIER PACKAGING MATERIAL

CROSS-REFERENCE TO RELATED APPLICATIONS

The present application is a 35 U.S.C. § 371 national stage patent application of International patent application PCT/JP2020/026048, filed on Jul. 2, 2020, which is based on and claims the benefits of priority to U.S. Provisional Application No. 62/884,759, filed on Aug. 9, 2019. The entire contents of these applications are incorporated herein by reference.

TECHNICAL FIELD

The present disclosure relates to a gas barrier film that can be used for packaging materials and is intended to limit water vapor and/or oxygen. Packaging materials are for packaging foods such as dried foods, confectionery, bread, and delicacies, or pharmaceutical products such as tablets, powder preparations, poultices, and patches (of course, other articles can also be packaged therewith). More particularly, the present disclosure relates to a barrier film used in the field of packaging for use applications that require high gas barrier properties and also require transparency enabling visual recognition of the contents. Furthermore, the present disclosure relates to a packaging material comprising this barrier film.

BACKGROUND ART

Resin films are used to package foods and other contents. For example, Patent Literature 1 discloses a barrier film for food packaging. Patent Literature 2 discloses a film in which a metal or metal oxide layer is laminated on a polyethylene film. Patent Literature 3 discloses a gas barrier film comprising a base material film and a coating layer including a water-soluble polymer and water-swellable mica.

CITATION LIST

Patent Literature

Patent Literature 1: U.S. Pat. No. 10,066,093
Patent Literature 2: US Unexamined Patent Publication No. 2016/0039181
Patent Literature 3: International Publication WO 2019/088265

SUMMARY OF INVENTION

Technical Problem

However, in recent years, due to growing awareness of environmental issues arising from the problems of marine plastic waste and the like, there is a demand for further increase of efficiency in classification waste dumping and recycling of plastic materials. That is, there is now a demand for monomaterialization even in the case of flexible packaging materials, for which performance improvement has been hitherto attempted by combining various materials of different types. However, under actual circumstances, it is difficult to obtain satisfactory barrier properties when it is attempted to realize monomaterialization of flexible packaging materials using polyolefin-based resins.

For example, flexible packaging materials in a state in which commercial products are housed may be bent or may undergo rubbing of flexible packaging materials against each other in the course of manufacturing and distribution. Flexible packaging materials need to retain gas barrier properties even after being subjected to such processes. This property required for packaging materials is referred to as "ability to withstand flex" in the present specification. The inventors of the present invention have found that in order for a barrier film to realize excellent ability to withstand flex, it is useful to adjust the flexibility of a barrier coat layer so that the barrier coat layer can sufficiently conform to the deformations of the base material film, that is, it is useful to impart ability to withstand deformation to the barrier coat layer.

The present disclosure provides a barrier film that is useful for a packaging material to realize excellent recyclability and has excellent ability to withstand flex, and a barrier packaging material.

Solution to Problem

A barrier film according to a first embodiment of the present disclosure comprises a base material film including a polyolefin-based resin; an inorganic oxide layer provided on one surface of the base material film; and a deformation-withstanding barrier coat layer provided on the inorganic oxide layer to be in contact therewith, wherein the deformation-withstanding barrier coat layer includes a hydroxyl group-containing polymer compound and water-swellable mica, and when the total mass of the deformation-withstanding barrier coat layer is taken as 100 parts by mass, the content of the water-swellable mica in the deformation-withstanding barrier coat layer is 5 parts by mass to 35 parts by mass.

According to the barrier film according to the first embodiment, the inorganic oxide layer and the deformation-withstanding barrier coat layer function as barrier layers, and excellent gas barrier properties are exhibited. With regard to the deformation-withstanding barrier coat layer, when the content of the water-swellable mica is in the above-described range, the deformation-withstanding barrier coat layer can conform to the deformations of the base material film, and therefore, the deformation-withstanding barrier coat layer can stably protect the inorganic oxide layer provided on the surface of the deformation-withstanding barrier coat layer. For this reason, the barrier film has excellent ability to withstand flex.

According to the barrier film related to the first embodiment, since the base material film includes a polyolefin-based resin, when the barrier film is used in combination with a sealant layer including a polyolefin-based resin, monomaterialization of the packaging material can be realized. Incidentally, according to the present disclosure, a monomaterial packaging material refers to a packaging material in which the mass ratio of a specific material (for example, a polyolefin-based resin) is 90% by mass or more.

A barrier film according to a second embodiment of the present disclosure is a laminated film comprising a base material film including polyethylene; and a deformation-withstanding barrier coat layer including a hydroxyl group-containing polymer compound. According to this barrier film, the deformation-withstanding barrier coat layer functions as a barrier layer, and excellent gas barrier properties are exhibited. Since the deformation-withstanding barrier coat layer can conform to the deformations of the base material film, the barrier film has excellent ability to withstand flex. Furthermore, according to this barrier film, since the base material film includes polyethylene, when the barrier film is used in combination with a sealant layer including polyethylene, monomaterialization of the packaging material can be realized.

A barrier packaging material according to an aspect of the present disclosure comprises the barrier film according to the above-described first or second embodiment; and a sealant layer including a polyolefin-based resin. From the viewpoint of realizing monomaterialization, it is preferable that the sealant layer is the same plastic material as the base material film. For example, when the base material film is a polyethylene film, it is preferable that the sealant layer is also a polyethylene film, and when the base material film is a polypropylene film, it is preferable that the sealant layer is also a polypropylene film. An ink layer is provided on, for example, the deformation-withstanding barrier coat layer of the barrier film.

Advantageous Effects of Invention

According to the present disclosure, a barrier film that is useful for realizing excellent recyclability of a packaging material and has excellent ability to withstand flex, and a barrier packaging material are provided.

DESCRIPTION OF EMBODIMENTS

Figure 1:
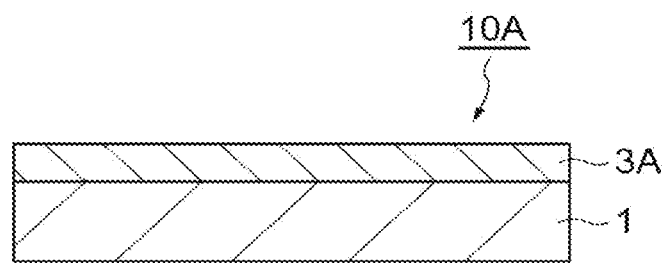
FIG. 1 is a cross-sectional view schematically illustrating the configuration of a barrier film according to a first embodiment of the present disclosure.

Embodiments of the present disclosure will be described below. The present invention is not necessarily limited to the following embodiments. These embodiments are only for illustrative purposes, and those ordinarily skilled in the art can comprehend the methods of carrying out the present invention by methods other than those described below. In the following description, identical reference numerals will be used for identical elements or elements having identical functions, and any overlapping descriptions will not be repeated.

<Barrier Film>

First Embodiment

FIG. 1 is a cross-sectional view schematically illustrating the configuration of a barrier film according to a first embodiment. The barrier film 10A shown in this diagram comprises at least a base material film 1 including polyethylene; and a deformation-withstanding barrier coat layer 3A as a barrier layer provided on one surface of the base material film. The deformation-withstanding barrier coat layer 3A includes at least a hydroxyl group-containing polymer compound.

The base material film 1 is a plastic film including polyethylene and is formed from, for example, a material including 50% or more of polyethylene. Polyethylene means a homopolymer of ethylene, or a copolymer of ethylene and 5 mol % or less of an α-olefin monomer. A resin material other than polyethylene can be mixed in at least as long as the possibility of recycling as a polyethylene resin is not excluded. The base material film 1 is preferably a material that can be recycled as polyethylene. The base material film 1 may include polyethylene derived from biomass or polyethylene as a recycled product. Incidentally, a case in which the base material film 1 is a polyethylene film is mentioned as an example here; however, the base material film 1 may be any olefin-based resin film other than polyethylene.

Regarding the polyethylene, for example, a material that is classified as a low-density polyethylene (LDPE), a medium-density polyethylene (MDPE), or a high-density polyethylene (HDPE) can be used. LDPE refers to a polyethylene having a density of 0.910 $g/cm^3$ or more and 0.925 $g/cm^3$ or less. MDPE refers to a polyethylene having a density of 0.926 $g/cm^3$ or more and 0.940 $g/cm^3$ or less. HDPE refers to a polyethylene having a density of 0.941 $g/cm^3$ or more and 0.965 $g/cm^3$ or less. LDPE is obtained by, for example, polymerizing ethylene at a high pressure such as 1000 atmospheres or higher and lower than 2000 atmospheres. MDPE and HDPE are obtained by, for example, polymerizing ethylene at a medium pressure or a low pressure, such as 1 atmosphere or higher and lower than 1000 atmospheres. MDPE and HDPE may partially include a copolymer of ethylene and an α-olefin.

The copolymer of ethylene and an α-olefin is, for example, a linear low-density polyethylene (hereinafter, also referred to as LLDPE). LLDPE is obtained by copolymerizing an α-olefin into a linear polymer obtainable by polymerizing ethylene at a medium pressure or a low pressure to introduce short-chain branching. Examples of the α-olefin include butene-1, hexene-1, 4-methylpentene, and octene-1. The density of LLDPE is, for example, 0.915 $g/cm^3$ or more and 0.945 $g/cm^3$ or less.

The base material film 1 may be a single-layer film or a multilayer film. From the viewpoint of heat resistance, a single-layer film of HDPE may be used, or HDPE may be used in the thickest core layer as a layer constituting the base material film 1. Furthermore, additives such as an oxidation inhibitor, a lubricating agent, an anti-blocking agent, and a neutralizing agent may be included. When a multilayer base material film is used, for example, a layer on the side where the barrier layer is laminated does not have to include a lubricating agent.

With regard to the base material film 1, in order to suppress deterioration of the barrier layer caused by thermal deformation, the coefficient of thermal shrinkage at 100° C. for 15 minutes in a first direction on the film plane and in a second direction orthogonal to the first direction may be 2% or less. The second direction orthogonal to the first direction is, for example, MD (resin flow direction) or TD (perpendicular direction). Furthermore, the coefficient of thermal shrinkage at 120° C. for 15 minutes may be 5% or less, or the coefficient of thermal shrinkage at 80° C. for 15 minutes may be 1% or less.

The base material film 1 may be an unstretched film, may be a uniaxially stretched oriented film or a biaxially stretched oriented film, or may be a film that has been subjected to a surface treatment (corona discharge treatment or the like) or an anchor coating treatment or undercoating treatment. The surface to be coated (surface where a coating film is formed) of the base material film 1 may be subjected to a corona treatment, a low-temperature plasma treatment, atmospheric pressure plasma, or the like. As a result, satisfactory wettability to the coating liquid and adhesive strength to the coating film are obtained.

The thickness of the base material film 1 is appropriately selected depending on the price and use application, while taking the suitability as a packaging material and the suitability for lamination of other coating films into consideration. The thickness of the base material film 1 is practically 3 μm to 200 μm, preferably 5 μm to 120 μm, and more preferably 10 μm to 100 μm.

With regard to the base material film 1, the base material film itself may have heat sealability such that one or both of the outermost surfaces of the packaging material are surfaces having heat sealability. As the base material film itself has heat sealability, the packaging material can be produced without sticking a sealant film to the base material film 1 or providing a sealant layer.

The deformation-withstanding barrier coat layer 3A includes a hydroxyl group-containing polymer compound. Specific examples of the hydroxyl group-containing polymer compound include water-soluble polymers such as ethylene vinyl alcohol, polyvinyl alcohol, polyvinylpyrrolidone, and starch, and polyvinyl alcohol in particular has excellent barrier properties and is preferred.

The thickness of the deformation-withstanding barrier coat layer 3A is, for example, in the range of 0.05 μm to 2.0 μm, and for example, the thickness may be 0.1 μm to 1 μm or may be 0.2 μm to 6 μm. It is preferable that the thickness of the deformation-withstanding barrier coat layer 3A is set to a thickness that exhibits barrier properties and a thickness that can reduce stress in the inorganic oxide layer, which will be described below.

The deformation-withstanding barrier coat layer 3A may include a hydroxyl group-containing polymer compound and water-swellable mica. When the total mass of the deformation-withstanding barrier coat layer 3A is taken as 100 parts by mass, the content of the water-swellable mica in the deformation-withstanding barrier coat layer 3A is, for example, in the range approximately indicated by 20 parts by mass to 50 parts by mass. The deformation-withstanding barrier coat layer 3A can be formed using a coating liquid including a hydroxyl group-containing polymer compound and water-swellable mica as solid contents. The solid content ratio of the water-swellable mica in the total solid content of this coating liquid may be, for example, in the range approximately indicated by 20% by mass to 50% by mass.

The mean area diameter of the water-swellable mica is, for example, in the range approximately indicated by 0.5 μm to 5 μm and may also be in the range approximately indicated by 1.5 μm to 2.5 μm. The aspect ratio of the water-swellable mica is, for example, in the range approximately indicated by 10 or more and 200 or less. The thickness of the deformation-withstanding barrier coat layer 3A is, for example, in the range approximately indicated by 0.1 μm to 1 μm and may also be in the range approximately indicated by 0.15 μm to 0.7 μm.

The deformation-withstanding barrier coat layer 3A may include a composition including at least one kind or more of a metal alkoxide or a hydrolysate thereof and a polymerization product, in addition to the hydroxyl group-containing polymer compound.

It is preferable that the metal alkoxide is formed from a composition including at least one selected from the group consisting of a metal alkoxide represented by the following Formula (1) and a hydrolysate thereof, or a polymerization product.

$$M(OR^1)_m(R^2)_{n-m} \quad (1)$$

In the above-described Formula (1), $R^1$ and $R^2$ each independently represent a monovalent organic group having 1 to 8 carbon atoms, and it is preferable that $R^1$ and $R^2$ are each an alkyl group such as a methyl group or an ethyl group. M represents an n-valent metal atom such as Si, Ti, Al, or Zr. m represents an integer from 1 to n.

Examples of the metal alkoxide include tetraethoxysilane $[Si(OC_2H_5)_4]$ and triisopropoxyaluminum $[Al(O-iso-C_3H_7)_3]$. The metal alkoxide is preferably tetraethoxysilane or triisopropoxyaluminum, from the viewpoint of being relatively stable in a water-based solvent after hydrolysis.

Examples of the hydrolysate of the metal alkoxide include silicic acid $(Si(OH)_4)$, which is a hydrolysate of tetraethoxysilane, and aluminum hydroxide $(Al(OH)_3)$, which is a hydrolysate of tripropoxyaluminum. These can be used not only singly but also in combination of a plurality of kinds thereof. The content of the metal alkoxide and the hydrolysate thereof in the above-described composition is, for example, 10% by mass to 90% by mass.

In the deformation-withstanding barrier coat layer 3A, various additives may be included as long as the additives do not impair the gas barrier properties and the strength as a packaging material. Examples of the additives include an oxidation inhibitor, a weatherproof agent, a thermal stabilizer, a lubricating agent, a crystal nucleating agent, an ultraviolet absorber, a plasticizer, an antistatic agent, a coloring agent, a filler, a surfactant, and a silane coupling agent.

The deformation-withstanding barrier coat layer 3A is formed by applying a coating liquid including at least a water-soluble polymer as a constituent component on a base material film by a known wet coating method and then heating and drying the coating liquid.

Second Embodiment

Figure 2:
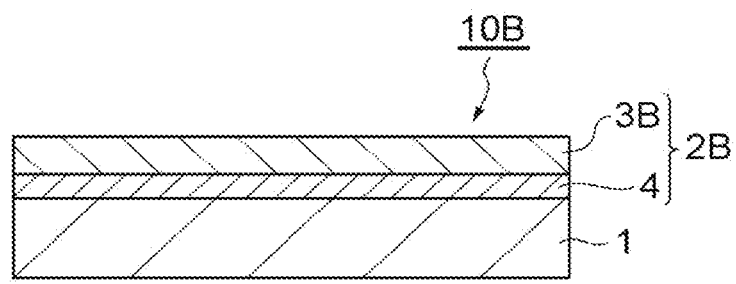
FIG. 2 is a cross-sectional view schematically illustrating the configuration of a barrier film according to a second embodiment of the present disclosure.

FIG. 2 is a cross-sectional view schematically illustrating the configuration of a barrier film according to a second embodiment. The barrier film 10B shown in this diagram is different from the barrier film 10A from the viewpoint that the barrier layer has a two-layer structure. That is, the barrier layer 2B is composed of a deformation-withstanding barrier coat layer 3B and an inorganic oxide layer 4. The inorganic oxide layer 4 is disposed between the deformation-withstanding barrier coat layer 3B and a base material film 1. By configuring the barrier layer 2B by means of the organic oxide layer 4 and the deformation-withstanding barrier coat layer 3B that is in contact therewith, enhancement of the bending resistance of the barrier layer and the barrier properties is expected. Incidentally, when the barrier layer has a multilayer structure, the deformation-withstanding barrier coat layer is provided, for example, on the outermost side of the barrier layer.

When the barrier layer 2B includes the inorganic oxide layer 4, it is preferable that the deformation-withstanding barrier coat layer 3B has a smaller content of the water-swellable mica as compared to the deformation-withstanding barrier coat layer 3A according to the first embodiment. That is, when the total mass of the deformation-withstanding barrier coat layer 3B is taken as 100 parts by mass, the content of the water-swellable mica in the deformation-withstanding barrier coat layer 3B is, for example, in the range approximately indicated by 5 parts by mass to 35 parts by mass. This value may also be 7 parts by mass or more, 10 parts by mass or more, or 12 parts by mass or more. This value may also be 30 parts by mass or less, 20 parts by mass or less, less than 20 parts by mass, or 17 parts by mass or less. Particularly, this content may be in the range of less than 10 parts by mass or 20 parts by mass or less, or 15 parts by mass. The deformation-withstanding barrier coat layer 3B can be formed using a coating liquid including a hydroxyl group-containing polymer compound and water-swellable mica as solid contents. The solid content ratio of the water-swellable mica in the total solid content of this coating liquid may be adjusted to be in the desired range.

When the content of the water-swellable mica in the deformation-withstanding barrier coat layer 3B is equal to or more than the above-described lower limit value, excellent gas barrier properties are exhibited due to a labyrinth effect brought by the water-swellable mica, and at the same time, excellent moisture resistance can be imparted to the deformation-withstanding barrier coat layer 3B. On the other hand, when the content of the water-swellable mica is equal to or less than the upper limit value, since the deformation-withstanding barrier coat layer 3B can conform to the deformations of the base material film 1, the inorganic oxide layer 4 can be stably protected, and excellent ability to withstand flex is exhibited. Furthermore, when the content of the water-swellable mica is in the above-described range, excellent adhesive strength of the inorganic oxide layer 4 and the deformation-withstanding barrier coat layer 3B is attained.

The characteristics such as thickness of the deformation-withstanding barrier coat layer 3B (excluding the content of the water-swellable mica) may be adjusted to be similar to those of the deformation-withstanding barrier coat layer 3A.

When the barrier layer 2B includes the inorganic oxide layer 4, it is possible to further enhance the barrier properties to oxygen and water vapor. The inorganic oxide layer 4 includes a metal oxide, and examples of the metal oxide include oxides of metals such as aluminum, copper, silver, yttrium, tantalum, silicon, and magnesium. The metal oxide is preferably aluminum oxide or silicon oxide from the viewpoint of being inexpensive and having excellent barrier performance, and in particular, silicon oxide having favorable water vapor barrier properties is particularly preferred. Furthermore, regarding silicon oxide, x in its composition SiOx may be 1.0 to 2.0. When x is 1.0 or more, there is a tendency that satisfactory gas barrier properties are likely to be obtained.

The method of forming the inorganic oxide layer 4 is preferably vacuum film formation. Examples of vacuum film formation include a physical vapor growth method and a chemical vapor growth method. Examples of the physical vapor growth method include a vapor deposition method, a sputtering method, and an ion plating method. Furthermore, examples of the chemical vapor growth method include a thermal CVD method, a plasma CVD method, and a photo CVD method.

The thickness of the inorganic oxide layer 4 is preferably 10 nm to 300 nm, and more preferably 20 nm to 100 nm. When the thickness of the inorganic oxide layer 4 is 10 nm or more, a uniform film is easily obtained, and gas barrier properties tend to be easily obtained. On the other hand, when the thickness of the inorganic oxide layer is 300 nm or less, pliability can be retained, and there is a tendency that cracks caused by external force such as folding tension after film formation are not likely to be generated.

Third Embodiment

Figure 3:
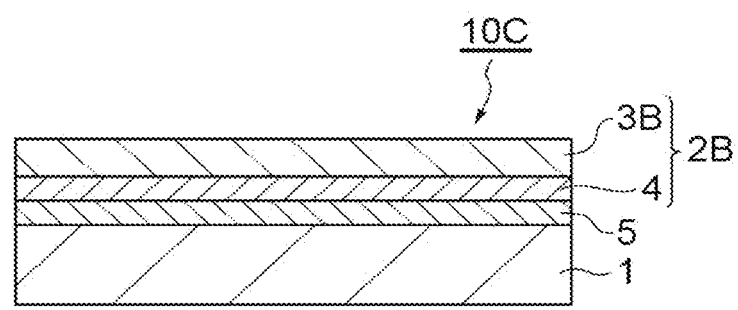
FIG. 3 is a cross-sectional view schematically illustrating a barrier film according to a third embodiment of the present disclosure.

FIG. 3 is a cross-sectional view schematically illustrating the configuration of a barrier film according to a third embodiment. The barrier film 10C shown in this diagram is different from the barrier film 10B from the viewpoint that an adhesiveness enhancing layer 5 is provided between the barrier layer 2B and the base material film 1. The adhesiveness enhancing layer 5 is a layer that enhances adhesiveness of the barrier layer 2B to the base material film 1. Particularly, when the adhesiveness enhancing layer 5 is configured to adjoin the inorganic oxide layer 4, since the surface where the inorganic oxide layer 4 is formed is flattened by the adhesiveness enhancing layer 5, even further enhancement of the barrier properties is expected.

It is preferable that the material constituting the adhesiveness enhancing layer 5 is selected from, for example, a solvent-soluble or water-soluble polyester resin, an isocyanate resin, a urethane resin, an acrylic resin, a vinyl alcohol resin, an ethylene vinyl alcohol resin, a vinyl-modified resin, an epoxy resin, an oxazoline group-containing resin, a modified styrene resin, a modified silicon resin, an alkyl titanate, or the like. These can be used singly or in combination of two or more kinds thereof.

The adhesiveness enhancing layer 5 can be formed by, for example, a well-known printing method such as an offset printing method, a gravure printing method, or a silk screen printing method; or a well-known coating method such as roll coating, knife edge coating, or gravure coating. With regard to the drying conditions, any conditions that are generally used may be used. Furthermore, in order to accelerate the reaction, a method of drying the film by leaving the film to stand in an aging chamber or the like at a high temperature for several days may be used. The thickness of the adhesiveness enhancing layer 5 is, for example, in the range of 0.01 μm to 1.0 μm.

Fourth Embodiment

Figure 4:
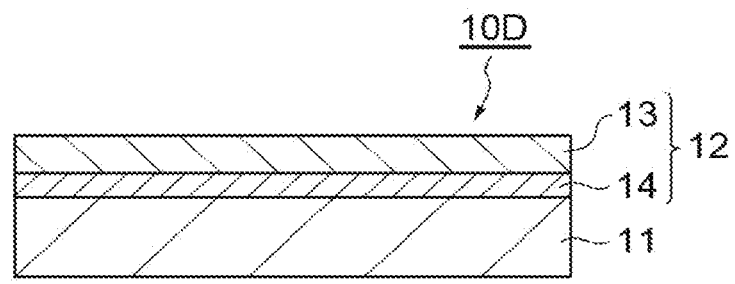
FIG. 4 is a cross-sectional view schematically illustrating the configuration of a barrier film according to a fourth embodiment of the present disclosure.

FIG. 4 is a cross-sectional view schematically illustrating the configuration of a barrier film according to a fourth embodiment. The barrier film 10D shown in this diagram comprises at least a base material film 11 and a barrier layer 12 provided on one surface of the base material film 11. The barrier layer 12 includes at least an inorganic oxide layer 14 and a deformation-withstanding barrier coat layer 13 provided to adjoin the inorganic oxide layer 14. As long as there is no contradiction, each configuration of the barrier film 10D can have the configurations of the above-mentioned embodiments incorporated therein.

The base material film 11 is formed from a plastic material. Examples of the base material film formed from a plastic material include films formed from polyolefin-based resins such as polyethylene, polypropylene, and a propylene-ethylene copolymer; polyester-based resins such as polyethylene terephthalate and polybutylene terephthalate; polyamide-based resins such as aliphatic polyamides such as nylon 6 and nylon 66, and aromatic polyamides such as poly(meta-xylylene adipamide); vinyl-based resins such as polystyrene, polyvinyl acetate, an ethylene-vinyl acetate copolymer, polyvinyl alcohol, and an ethylene-vinyl alcohol copolymer; acrylic resins such as homopolymers or copolymers of (meth)acrylic monomers, such as polymethyl methacrylate and polyacrylonitrile; and Cellophane. These resins are used singly or in combination of two or more kinds thereof.

Among these, as the base material film 11, a polyolefin-based resin film (particularly, a polypropylene film or the like), a polyester-based resin film (particularly, a polyethylene terephthalate-based resin film), a polyimide-based resin film (particularly, a nylon film), and the like are suitably used.

As the base material film 11, a single-layer film composed of a single resin, or a single-layer or laminated film produced using a plurality of resins is used. Furthermore, laminated base materials obtained by laminating these resins on other base materials (metal, wood, paper, ceramic, or the like) may also be used.

The base material film 11 may be an unstretched film, may be a uniaxially stretched oriented film or a biaxially stretched oriented film, or may be a film that has been subjected to a surface treatment (corona discharge treatment or the like) or an anchor coating treatment or undercoating treatment. By subjecting the surface to be coated (surface where a coating film is formed) of the base material film 11 to a corona treatment, a low-temperature plasma treatment, atmospheric pressure plasma, or the like, satisfactory wettability to the coating liquid and adhesive strength to the coating film are obtained.

The thickness of the base material film 11 is not particularly limited and is appropriately selected depending on the price and use application, while taking the suitability as a packaging material and the suitability for lamination of other coating films into consideration. The thickness of the base material film is practically 3 μm to 200 μm, preferably 5 μm to 120 μm, and more preferably 10 μm to 100 μm.

With regard to the base material film 11, the base material film itself may have heat sealability such that one or both of the outermost surfaces of the packaging material are surfaces having heat sealability. As the base material film itself has heat sealability, the packaging material can be produced without sticking a sealant film to the base material film or providing a sealant layer.

Regarding the inorganic oxide layer 14, a layer similar to the inorganic oxide layers 4 of the above-described embodiments can be applied.

The deformation-withstanding barrier coat layer 13 includes at least a water-soluble polymer (hydroxyl group-containing polymer compound) and water-swellable mica. When the deformation-withstanding barrier coat layer 13 is provided to adjoin the surface of the inorganic oxide layer 14 opposite to the base material, even in a case where the base material film 11 is deformed by heat or the like, the barrier properties can be retained as the deformation-withstanding barrier coat layer 13 supplements the barrier properties of the inorganic oxide layer 14.

[Water-Soluble Polymer]

A water-soluble polymer is a polymer that can be completely dissolved or finely dispersed in water at a specific temperature. The water-soluble polymer is not particularly limited as long as it is a compound capable of penetrating and coordinating (intercalation) between unit crystal layers of an inorganic layered mineral, which will be described below, and examples thereof include polyvinyl alcohol and derivatives thereof; cellulose derivatives such as carboxymethyl cellulose and hydroxyethyl cellulose; starches such as oxidized starch, etherified starch, and dextrin; polyvinylpyrrolidone, polyacrylic acid, and polymethacrylic acid or an ester salt and copolymers thereof; copolymerized polyester containing a polar group such as a sulfoisophthalic acid; vinyl-based polymers such as polyhydroxyethyl methacrylate and copolymers thereof; urethane-based polymers; or polymers modified with functional groups such as a carboxyl group from these various polymers.

The water-soluble polymer is, for example, a polyvinyl alcohol resin having a degree of saponification of 95% or more. Since a polyvinyl alcohol resin has a tendency that as the degree of saponification or the degree of polymerization is higher, the hygroscopic swelling property is lowered, and when the degree of saponification is 95% or higher, sufficient gas barrier properties are likely to be obtained.

When the water-soluble polymer is a polyvinyl alcohol resin, at least one kind in the polyvinyl alcohol resin may be a polyvinyl alcohol-based polymer and a derivative thereof.

The degree of polymerization of the polyvinyl alcohol resin is, for example, 1100 to 2300 and may be 1500 to 2000. When the degree of polymerization of the polyvinyl alcohol resin is in the above-described range, a film having improved gas barrier properties and improved cohesive strength of the coating layer can be obtained.

[Water-Swellable Mica]

Mica is a type of inorganic lamellar mineral in which ultra-thin unit crystal layers are stacked to form one lamellar particle. Mica includes natural mica and synthetic mica. Examples thereof include muscovite, phlogopite, biotite, potassium phlogopite, potassium tetrasilicon mica, potassium taeniolite, potassium fluoride tetrasilicon mica, sodium fluoride tetrasilicon mica, sodium phlogopite, sodium tetrasilicon mica, and sodium hectorite. For the purpose of the present invention, one kind of mica can be used, or two or more kinds of different micas can be combined.

Regarding mica, those swell and cleave in water are preferred, and among these, water-swellable mica having a swelling property in water is preferably used. More specifically, preferred mica is synthetic mica that coordinates water between ultra-thin unit crystal layers and has properties of absorbing and swelling and is generally a compound in which a layer in which $Si^{4+}$ coordinates with $O^{2-}$ to form a tetrahedral structure, and a layer in which $Al^{3+}$, $Mg^{2+}$, $Fe^{2+}$, $Fe^{3+}$, and the like coordinate with $O^{2-}$ and $OH^-$ to form an octahedral structure, are bound at a ratio of 1:1 or 2:1 and are stacked to form a lamellar structure. For example, sodium fluoride tetrasilicon mica is preferred.

With regard to the size of the water-swellable mica, from the viewpoint that when the aspect ratio is high, the barrier properties of the film are improved, the aspect ratio of the water-swellable mica is, for example, 10 to 200 and may also be 50 to 150. When the aspect ratio of the water-swellable mica is in the above-described range, there is a high possibility that a film having improved gas barrier properties may be obtained, and at the same time, decreases in the cohesive strength of the coating layer and the adhesive strength of the coating layer to the base material can be prevented.

Furthermore, the mean area diameter (MA) of the water-swellable mica is, for example, 0.5 μm to 5 μm, and the mean area diameter may be 1 μm to 3 μm or may be 1.5 μm to 2.5 μm. The mean area diameter is the area-weighted average particle size. When the mean area diameter of the water-swellable mica is in the above-described range, since the water-swellable mica is more uniformly dispersed in the coating layer without precipitating, a film in which gas barrier properties and transparency are maintained or improved can be obtained.

When a water-swellable synthetic mica is used as the water-swellable mica, since the water-swellable synthetic mica has high compatibility with the water-soluble polymer and has less impurities as compared to naturally occurring mica, deterioration in the gas barrier properties originating from impurities and deterioration in the cohesive strength of the deformation-withstanding barrier coat layer do not occur. Although it is not intended to be limited to a specific mechanism, it is considered that a water-swellable synthetic mica has fluorine atoms in the crystal structure and therefore contributes to suppressing the moisture-dependency of the gas barrier properties of the deformation-withstanding barrier coat layer to a low level. Furthermore, since a water-swellable synthetic mica has a high aspect ratio as compared to other water-swellable inorganic lamellar mineral, the labyrinth effect works more effectively, and the water-swellable synthetic mica contributes particularly to causing the gas barrier properties of the coating layer to be highly exhibited.

Particularly, when the water-soluble polymer is a polyvinyl alcohol resin, the water-swellable synthetic mica has high compatibility with the polyvinyl alcohol resin. In addition, when the mean area diameter of the water-swellable synthetic mica is, for example, 0.5 µm to 5 µm, furthermore when the mean area diameter is 1 µm to 3 µm, or when the mean area diameter is 1.5 µm to 2.5 µm, the water-swellable synthetic mica has higher compatibility with the polyvinyl alcohol resin.

When the water-swellable synthetic mica has higher compatibility with the polyvinyl alcohol resin, a polyvinyl alcohol having a higher degree of polymerization can be used. By using a polyvinyl alcohol having a higher degree of polymerization, a film having further improved gas barrier properties can be obtained.

Specifically, when the mean area diameter of the water-swellable synthetic mica is, for example, 0.5 µm to 5 µm, furthermore when the mean area diameter is 1 µm to 3 µm, or when the mean area diameter is 1.5 µm to 2.5 µm, the degree of polymerization of the polyvinyl alcohol can be adjusted to 1100 or higher, and a film having further improved gas barrier properties can be obtained.

When the total mass of the deformation-withstanding barrier coat layer 13 is taken as 100 parts by mass, the content of the water-swellable mica in the deformation-withstanding barrier coat layer 13 is, for example, in the range approximately indicated by 5 parts by mass to 35 parts by mass. This value may be 7 parts by mass or more, 10 parts by mass or more, or 12 parts by mass or more. This value may also be 30 parts by mass or less, 20 parts by mass or less, less than 20 parts by mass, or 17 parts by mass or less. Particularly, this content may be in the range of 10 parts by mass or more and less than 20 parts by mass, or 15 parts by mass. Incidentally, the deformation-withstanding barrier coat layer 13 can be formed using a coating liquid including a hydroxyl group-containing polymer compound and water-swellable mica as solid contents. The solid content ratio of the water-swellable mica in the total solid content of this coating liquid may be adjusted to be in the desired range.

When the content of the water-swellable mica of the deformation-withstanding barrier coat layer 13 is equal to or more than the above-described lower limit value, excellent gas barrier properties are exhibited by the labyrinth effect caused by the water-swellable mica, and at the same time, excellent moisture resistance can be imparted to the deformation-withstanding barrier coat layer 3B. On the other hand, when the content of the water-swellable mica is equal to or more than the upper limit value, since the deformation-withstanding barrier coat layer 13 can conform to the deformations of the base material film 11, the inorganic oxide layer 14 can be stably protected, and excellent ability to withstand flex is exhibited. Furthermore, when the content of the water-swellable mica is in the above-described range, excellent adhesive strength of the inorganic oxide layer 14 and the deformation-withstanding barrier coat layer 13 is attained.

The deformation-withstanding barrier coat layer 13 can be formed by a known wet coating method. For example, the deformation-withstanding barrier coat layer 13 is formed by applying a coating liquid including at least a water-soluble polymer and water-swellable mica as main constituent components and then drying and removing the solvent component.

The coating liquid may mainly include water as the solvent and may also include a solvent that is dissolved in or uniformly mixed with water. Examples of the solvent include alcohols such as methanol, ethanol, and isopropanol; ketones such as acetone and methyl ethyl ketone; ethers such as tetrahydrofuran; cellosolves; carbitols; and nitriles such as acetonitrile.

Examples of the wet coating method to be used include roll coating, gravure coating, reverse coating, die coating, screen printing, and spray coating. The coating liquid is applied on one or both surfaces of the base material film using these wet coating methods. Regarding the method of drying the coating film, known drying methods such as hot air drying, hot roll drying, and infrared irradiation are used.

The thickness of the deformation-withstanding barrier coat layer formed on the inorganic oxide layer 14 may be, for example, 0.1 µm to 1 µm, may be 0.15 µm to 0.7 µm, or may be 0.2 µm to 0.5 µm. When the thickness of the deformation-withstanding barrier coat layer is 0.1 µm or more, sufficient gas barrier properties are easily obtained. On the other hand, when the thickness of the deformation-withstanding barrier coat layer is more than 1 µm, not only it is difficult to provide a uniform coating film surface, but also this leads to an increase in the drying load and an increase in the production cost, which is not preferable.

The thickness of the deformation-withstanding barrier coat layer formed on the inorganic oxide layer 14 can be made thinner while retaining sufficient barrier properties, by adjusting the average particle size of the water-swellable mica included in the deformation-withstanding barrier coat layer. It is because when the average particle size of the water-swellable mica included in the deformation-withstanding barrier coat layer is adjusted, the water-swellable mica is more uniformly dispersed in the deformation-withstanding barrier coat layer. For example, when the mean area diameter of the water-swellable mica is adjusted to the range of 0.5 µm to 5 µm, or to the range of 1 µm to 3 µm, or to the range of 1.5 µm to 2.5 µm, the thickness of the deformation-withstanding barrier coat layer can be adjusted to 1 µm or less while retaining sufficient barrier properties.

The deformation-withstanding barrier coat layer 13 may include various additives as long as the additives do not impair the gas barrier properties and the strength as a packaging material. Examples of the additives include an oxidation inhibitor, a weatherproof agent, a thermal stabilizer, a lubricating agent, a crystal nucleating agent, an ultraviolet absorber, a plasticizing agent, an antistatic agent, a coloring agent, a filler, a surfactant, and a silane coupling agent.

Incidentally, an adhesiveness enhancing layer 5 (see FIG. 3) may be provided between the inorganic oxide layer 14 and the base material film 11. Since the surface where the inorganic oxide layer 4 is formed is flattened by the adhesiveness enhancing layer 5, further enhancement of the barrier properties is expected.

<Barrier Packaging Material>

Figure 5:
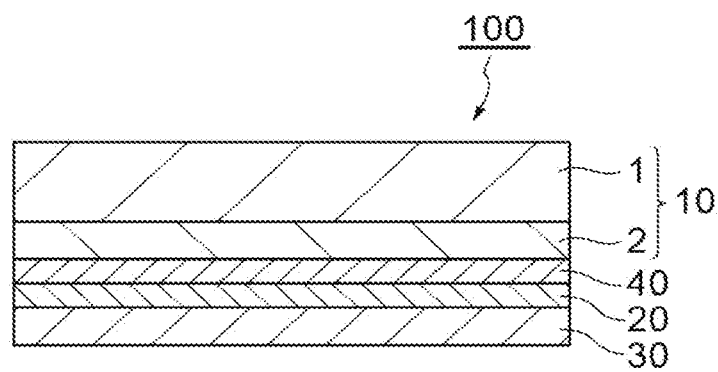
FIG. 5 is a cross-sectional view schematically illustrating the configuration of a packaging material according to an embodiment of the present disclosure.

FIG. 5 is a cross-sectional view schematically illustrating the configuration of the packaging material according to the present embodiment. The packaging material 100 comprises a barrier film 10, an adhesive layer 20, and a sealant layer 30 in this order. The barrier film 10 comprises a base material film 1 and a barrier layer 2. An adhesive layer 20 is provided between the barrier layer 2 of the barrier film 10 and the sealant layer 30. An ink layer 40 is provided on the surface of the barrier layer 2 (surface on the opposite side of the base material film 1 side surface).

The barrier film 10 is, for example, a film having a configuration similar to any one of the barrier films 10A to 10D according to the above-described embodiments.

Regarding the adhesive constituting the adhesive layer 20, adhesives based on acrylic, polyester, ethylene-vinyl acetate, urethane, vinyl chloride-vinyl acetate, chlorinated polypropylene, and the like can be used according to the materials of the various layers to be laminated. A solvent-free adhesive may also be used as the adhesive. The adhesive layer 20 can be formed using, for example, a roll coater, a reverse roll coater, a gravure coater, a microgravure coater, a knife coater, a bar coater, a wire bar coater, a die coater, a dip coater, or the like. The coating amount of the adhesive is, for example, 1 g/m$^2$ to 10 g/m$^2$.

The sealant layer 30 functions as an adhesion part at the time of packaging contents using the packaging material. Examples of the material constituting the sealant layer 30 include an unstretched polyethylene film and an unstretched polypropylene film. The thickness of the sealant layer 30 is, for example, 15 μm to 200 μm.

It is preferable that the sealant layer 30 is the same plastic material as the base material film 1. For example, when the base material film 1 is a polyethylene film, it is preferable that the sealant layer 30 is also a polyethylene film, and when the base material film 1 is a polypropylene film, it is preferable that the sealant layer 30 is also a polypropylene film. Here, being the same plastic material means that the plastic materials of the main components constituting the base material film 1 and the sealant layer 30 are the same, and it implies that the materials can be recycled by the same recycling process. As long as the materials can be recycled by the same recycling process, other different components may be included in the materials. When two base material films are formed from the same plastic material, it is possible to impart suitability for recycling as packaging materials. The sealant layer 30 may include a resin material derived from biomass or a resin material as a recycled product.

The ink layer 40 is a layer on which characters, patterns, and the like are formed in order to practically use the packaging material as a packaging bag or the like. For example, the ink layer 40 is a layer configured to include an ink obtained by adding various pigments, extender pigments, and additives such as a plasticizer, a desiccant, and a stabilizer to an ink binder resin based on urethane, acrylic, nitrocellulose, rubber, vinyl chloride, or the like. A biomass ink or a flexographic ink may also be used as the ink. Incidentally, the ink layer 40 may be provided on the surface of the base material film 1.

The oxygen permeability of the barrier film 10 is, for example, 10 cm$^3$/m$^2$·day·atm or less and can be adjusted to 5 cm$^3$/m$^2$·day·atm or less. The water vapor permeability of the barrier film 10 is, for example, 3 g/m$^2$·day or less and can be adjusted to 1.5 g/m$^2$·day or less.

The oxygen permeability of the packaging material 100 is, for example, 10 cm$^3$/m$^2$·day·atm or less and can be adjusted to 5 cm$^3$/m$^2$·day·atm or less. The water vapor permeability of the packaging material 100 is, for example, 5 g/m$^2$·day or less and can be adjusted to 1.5 g/m$^2$·day or less. The packaging material 100 can be utilized as, for example, a flexible packaging material for dry contents, liquid contents, foods, and non-foods.

The peeling strength (lamination strength) of the barrier film 10 may be 1 N/15 mm or more or may be 2 N/15 mm or more. This peeling strength is the peeling strength obtainable when the barrier layer 2 side surface of the barrier film 10 and the sealant layer 30 (or another plastic film) are stuck together, with the adhesive layer 20 interposed therebetween. This peeling strength means a value measured according to a peeling adhesive strength test method for T-type peeling (JIS K6854-3, ISO11339) or a peeling adhesive strength test method for 180-degree peeling (JIS K6854-2, ISO8510-2). The measurement sample may be produced by cutting a laminated body including the barrier film 10 into a strip form having a width of 15 mm.

The heat seal strength at the time of heat sealing between the sealant layers 30 of the packaging material 100 may be 15 N/15 mm or more or may be 30 N/15 mm or more. This heat seal strength means a value measured according to a peeling adhesive strength test method for T-type peeling (JTS K6854-3, ISO11339). The measurement sample may be produced by cutting a laminated body including the packaging material 100 after heat sealing into a strip form having a width of 15 mm.

EXAMPLES

Hereinafter, the present disclosure will be described based on Examples and Comparative Examples. The present invention is not intended to be limited to the following Examples.

<Base Material Film>

Films A to C including polyethylene were prepared.
Film A: MD-stretched film obtained by laminating HDPE as a core layer and MDPE on both surfaces thereof.
Film B: MD-stretched film formed from HDPE.
Film C: Unstretched film formed from HDPE.

The thickness and the coefficient of thermal shrinkage of the films A to C are shown in Table 1.

TABLE 1

| | | Coefficient of thermal shrinkage [%] | | | | | | |
| | | 80° C. · 15 min | | 100° C. · 15 min | | 110° C. · 15 min | | 120° C. · 15 min | |
| | Thickness [μm] | TD | MD | TD | MD | TD | MD | TD | MD |
| Film A | 19 | 0.27 | 0.10 | 0.80 | 0.17 | 1.70 | 0.14 | 6.90 | −0.06 |
| Film B | 25 | 0.26 | −0.01 | 0.57 | 0.01 | 1.40 | 0.01 | 4.30 | −0.09 |
| Film C | 32 | 0.64 | −0.11 | 1.00 | −0.09 | 1.20 | −0.06 | 1.80 | 0.00 |

<Preparation of Deformation-Withstanding Barrier Coat Layer>

A solution described below was prepared and used as a coating liquid for the deformation-withstanding barrier coat layer.

A polyvinyl alcohol resin (PVA, Selvol-325 (degree of saponification 98% to 99%, degree of polymerization 1700), manufactured by Sekisui Specialty Chemicals America, LLC.) was used as the hydroxyl group-containing polymer compound. The polyvinyl alcohol resin and water were mixed and heated to 95° C., and the polyvinyl alcohol resin was dissolved in water. This mixture was cooled to room temperature, subsequently the mixture was diluted with water and isopropanol (mass ratio was 1:1) such that the final solid content concentration was 5% by mass, and component (A) was prepared.

A water-swellable synthetic mica (SOMASIF MEB-3, manufactured by Katakura & Co-op Agri Corporation) was used as the water-swellable mica. The water-swellable synthetic mica was treated using a bead mill such that the areal particle size became 2 μm. Subsequently, water was mixed in such that the final solid content concentration became 8% by mass, and component (B) was prepared.

The component (A) and the component (B) were diluted with water and methanol (mass ratio was 1:1) so that the content of the water-swellable synthetic mica in the final deformation-withstanding barrier coat layer became 15% by mass, and deformation-withstanding barrier coat layer coating liquid A was prepared.

The component (A) and the component (B) were diluted with water and methanol (mass ratio was 1:1) so that the content of the water-swellable synthetic mica in the final deformation-withstanding barrier coat layer became 35% by mass, and deformation-withstanding barrier coat layer coating liquid B was prepared.

The component (A) and the component (B) were diluted with water and methanol (mass ratio was 1:1) so that the content of the water-swellable synthetic mica in the final deformation-withstanding barrier coat layer became 25% by mass, and deformation-withstanding barrier coat layer coating liquid C was prepared.

The component (A) and the component (B) were diluted with water and methanol (mass ratio was 1:1) so that the content of the water-swellable synthetic mica in the final deformation-withstanding barrier coat layer became 22.5% by mass, and deformation-withstanding barrier coat layer coating liquid D was prepared.

The component (A) and the component (B) were diluted with water and methanol (mass ratio was 1:1) so that the content of the water-swellable synthetic mica in the final deformation-withstanding barrier coat layer became 20% by mass, and deformation-withstanding barrier coat layer coating liquid E was prepared.

The component (A) and the component (B) were diluted with water and methanol (mass ratio was 1:1) so that the content of the water-swellable synthetic mica in the final deformation-withstanding barrier coat layer became 5% by mass, and deformation-withstanding barrier coat layer coating liquid F was prepared.

The component (A) was diluted with water and methanol (mass ratio was 1:1), and barrier coat layer coating liquid G was prepared.

The component (A) and the component (B) were diluted with water and methanol (mass ratio was 1:1) so that the content of the water-swellable synthetic mica in the final deformation-withstanding barrier coat layer became 40% by mass, and barrier coat layer coating liquid H was prepared.

The component (A) and the component (B) as well as a silane coupling agent and tetraethoxysilane were diluted with water and methanol (mass ratio was 1:1), and barrier coat layer coating liquid I having the following composition was prepared.

PVA: 30.5 parts by mass
Water-swellable synthetic mica: 2.1 parts by mass
Silane coupling agent: 4.4 parts by mass
Tetraethoxysilane: 63.0 parts by mass <Production of Barrier Film>

Example 1

A coating liquid for adhesive layer formation including an acrylic polyol, an isocyanate compound, and an epoxy-based silane coupling agent was applied on the film A and was heated and dried, and an adhesiveness enhancing layer having a coating amount after drying of 0.1 g/m$^2$ was formed. Silicon oxide (SiOx, x=1.8) was vapor-deposited on the surface where the adhesiveness enhancing layer was formed, and an inorganic oxide layer having a thickness of 0.03 μm was formed.

The deformation-withstanding barrier coat layer coating liquid A was applied on the inorganic oxide layer by a gravure coating method and was dried. As a result, a barrier film comprising a deformation-withstanding barrier coat layer (thickness 0.3 μm) was obtained.

Example 2

A barrier film of Example 2 was produced by a process similar to that of Example 1, except that the coating amount of the coating liquid for the deformation-withstanding barrier coat layer was changed, and the thickness of the deformation-withstanding barrier coat layer was changed to 0.6 μm.

Example 3

A barrier film of Example 3 was produced by a process similar to that of Example 1, except that the base material film was changed to the film A.

Example 4

A barrier film of Example 4 was produced by a process similar to that of Example 3, except that the coating amount of the coating liquid for the deformation-withstanding barrier coat layer was changed, and the thickness of the deformation-withstanding barrier coat layer was changed to 0.6 μm.

Example 5

A barrier film of Example 5 was produced by a process similar to that of Example 1, except that the base material film was changed to the film C.

Example 6

A barrier film of Example 6 was produced by a process similar to that of Example 5, except that the coating amount of the coating liquid for the deformation-withstanding barrier coat layer was changed, and the thickness of the deformation-withstanding barrier coat layer was changed to 0.6 μm.

Example 7

The deformation-withstanding barrier coat layer coating liquid B was applied on the film C by a gravure coating method and dried, a deformation-withstanding barrier coat layer having a thickness of 0.3 μm was formed, and a barrier film of Example 7 was produced.

<Evaluation of Barrier Films According to Examples 1 to 7>
[Measurement of Oxygen Permeability (Isopiestic Method)]

The oxygen permeability ($cm^3/m^2 \cdot day \cdot atm$) in an atmosphere at 30° C. and 70% RH was measured using oxygen permeability analyzer MOCON (OX-TRAN2/21, manufactured by Modern Controls, Inc.). The results of measuring the oxygen permeability of the gas barrier films are shown in Table 2.

[Measurement of Water Vapor Permeability]

The water vapor permeability ($g/m^2 \cdot day$) in an atmosphere at 40° C. and 90% RH was measured using water vapor permeability analyzer PERMATRAN W-3/33 MG (manufactured by Modern Controls, Inc.). The results of measuring the water vapor permeability of the gas barrier films are shown in Table 2.

[Measurement of Coefficient of Thermal Shrinkage]

Figure 6A:
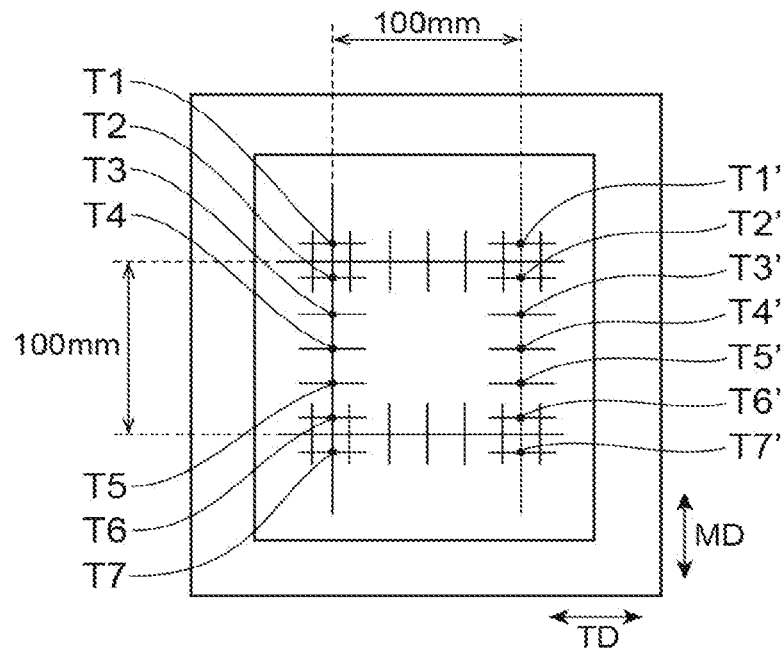
FIG. 6A and FIG. 6B are diagrams for explaining a method for measuring the coefficient of thermal shrinkage.
Figure 6B:
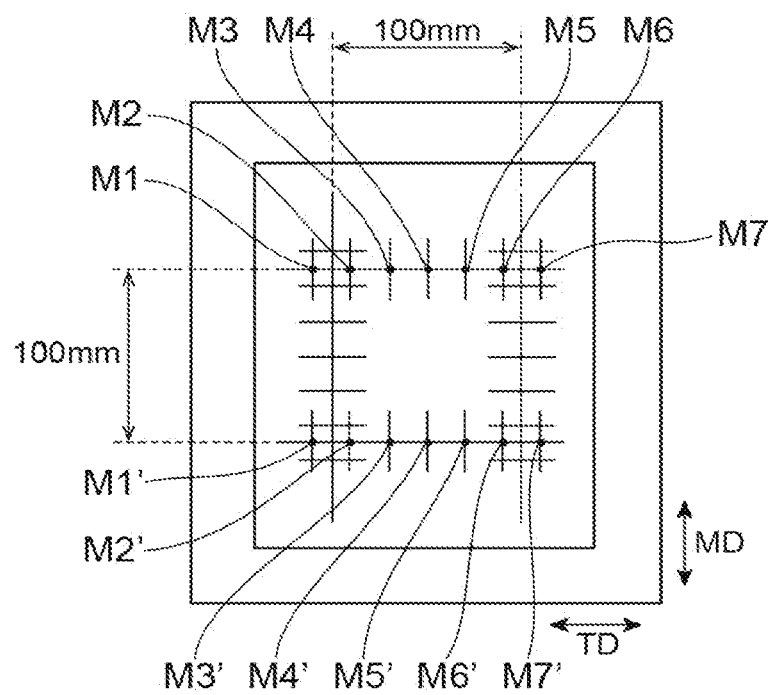

A letter-size (8.5 in×11 in=215.9 mm×297.4 mm) sample was cut out from a base material film, and two points each parallel to TD and MD were plotted at seven sites as shown in FIG. 6A and FIG. 6B (the distances of Tn-Tn' and Mn-Mn' were all set to 10 mm). The film was disposed on a glass plate without being fixed, the set temperature of the oven was set to the heating temperature shown in Table 1, and the film was heated for 15 minutes in the oven. The distances of Tn-Tn' and Mn-Mn' in the film taken out were measured, and the value of Tn-Tn' (after heating)/Tn-Tn' (before heating) and the value of Mn-Mn' (after heating)/Mn-Mn' (before heating) were designated as the coefficients of thermal shrinkage in TD and MD, respectively.

[Measurement of Lamination Strength]

An LLDPE (Linear Low Density Polyethylene) film having a thickness of 60 μm was laminated on each of the barrier films of Examples 1 to 7, and a barrier packaging material was produced. This barrier packaging material was a product obtained by laminating the LLDPE film by dry lamination processing such that the LLDPE film and the deformation-withstanding barrier coat layer faced to each other, with a polyester urethane-based adhesive (TAKELAC A-525, manufactured by Mitsui Chemicals, Inc./TAKENATE A-52, manufactured by Mitsui Chemicals, Inc.) interposed therebetween, and curing (aging) the laminate at 40° C. for 48 hours. This packaging material was cut into a strip form having a width of 15 mm, and the gas barrier film was peeled at a rate of 300 mm/min using a TENSILON Universal Material Testing Machine (manufactured by A & D Co., Ltd.) to measure the lamination strength. Measurement was carried out according to the peeling adhesive strength test method for T-type peeling (JIS K6854-3, ISO11339) and the peeling adhesive strength test method for 180-degree peeling (JIS K6854-2, ISO08510-2). The results are presented in Table 2. Incidentally, the peeling interface was recognized in between the base material film and the deformation-withstanding barrier coat layer in all cases.

TABLE 2

|  |  | Example | | | | | | |
| --- | --- | --- | --- | --- | --- | --- | --- | --- |
|  |  | 1 | 2 | 3 | 4 | 5 | 6 | 7 |
| Base material film (polyethylene film) | | A | A | B | B | C | C | C |
| Adhesiveness enhancing layer | | Present | Present | Present | Present | Present | Present | Absent |
| Inorganic oxide layer | | Present | Present | Present | Present | Present | Present | Absent |
| deformation-withstanding barrier coat layer | Thickness [μm] | 0.3 | 0.6 | 0.3 | 0.6 | 0.3 | 0.6 | 0.3 |
| | Content of PVA [mass %] | 85 | 85 | 85 | 85 | 85 | 85 | 65 |
| | Content of water-swellable mica [mass %] | 15 | 15 | 15 | 15 | 15 | 15 | 35 |
| Oxygen permeability [cm3/m² · day · atm] | | 2.5 | 2.0 | 2.0 | 1.1 | 0.18 | 0.24 | 1.6 |
| Water vapor permeability [g/m2 · day] | | 4.4 | 3.4 | 1.6 | 1.4 | 0.44 | 0.49 | 1.0 |
| Peeling strength [N/15 mm] | T-type peeling | 1.5 | 1.6 | 1.9 | 1.4 | 1.3 | 1.3 | 1.3 |
| | 180° peeling | 2.5 | 2.9 | 3.7 | 3.9 | 3.1 | 2.6 | 2.6 |

<Evaluation of Barrier Packaging Materials According to Example 1 and Example 7>
[Heat Seal Strength]

Two sheets each of the barrier packaging materials according to Example 1 and Example 7 were prepared. Two sheets of a barrier packaging material were superposed such that the sealant layers faced each other, and the assembly was heat-sealed using a heat sealer under the conditions of 160° C. and 0.2 MPa for 1 second. The sample after heat sealing was cut into a strip form having a width of 15 mm, and measurement of the heat seal strength was carried out according to the "Testing methods for heat-sealed flexible packages" described in JIS Z0238:1998. The measurement of the heat seal strength was carried out using a TENSILON Universal Material Testing Machine (manufactured by A & D Co., Ltd.) at a tensile rate of 300 mm/min. The results are presented in Table 3.

[Measurement of Oxygen Permeability (Isopiestic Method)]

The oxygen permeability ($cm^3/m^2 \cdot day \cdot atm$) in an atmosphere at 30° C. and 70% RH was measured using oxygen permeability analyzer MOCON (OX-TRAN2/21, manufactured by Modern Controls, Inc.). The results of measuring the oxygen permeability of the gas barrier films are presented after the item "After lamination" in Table 3.

[Measurement of Water Vapor Permeability]

The water vapor permeability ($g/m^2 \cdot day$) in an atmosphere at 40° C. and 90% RH was measured using water vapor permeability analyzer PERMATRAN W-3/33 MG (manufactured by Modern Controls, Inc.). The results of measuring the water vapor permeability of the barrier packaging materials are presented after the item "After lamination" in Table 3.

[Flex Test]

Each of the barrier packaging materials according to Example 1 and Example 7 was cut out into a size of 295 mm in length×210 mm in width to obtain samples. These samples were subjected to the following flex test. That is, a sample was attached to a fixed head of a Gelbo flex tester manufactured by Tester Sangyo Co., Ltd. so as to form a cylinder shape having a size of 87.5 mm in diameter×210 mm Both ends of the sample were held, the initial gripping interval was set to 175 mm, a twist of 440° was applied with a stroke of 87.5 mm, and repeated reciprocating motion of this operation was performed 50 times at a speed of 40 times/minute to bend the sample. For the samples after the flex test, the oxygen permeability and the water vapor permeability were measured by the above-described methods. The results are presented after the item "After flex test" in Table 3.

TABLE 3

| | | Example 1 | Example 7 |
|---|---|---|---|
| Heat seal strength [N/15 mm] | | 40.8 | 15.2 |
| Oxygen permeability | After lamination | 0.23 | 0.39 |
| [cm$^3$/m$^2$ · day · atm] | After flex test | 0.93 | 0.60 |
| Water vapor permeability | After lamination | 0.5 | 1.6 |
| [g/m$^2$ · day] | After flex test | 0.95 | 1.7 |

Example 8

A barrier film of Example 8 was produced by a process similar to that of Example 1, except that the base material film was changed to a biaxially stretched polypropylene film (PP, thickness 20 μm, manufactured by Polo Films Industria e Comercio S/A), and the deformation-withstanding barrier coat layer coating liquid B was used instead of the deformation-withstanding barrier coat layer coating liquid A.

Example 9

A barrier film of Example 9 was produced by a process similar to that of Example 8, except that the deformation-withstanding barrier coat layer coating liquid C was used instead of the deformation-withstanding barrier coat layer coating liquid B.

Example 10

A barrier film of Example 10 was produced by a process similar to that of Example 8, except that the deformation-withstanding barrier coat layer coating liquid D was used instead of the deformation-withstanding barrier coat layer coating liquid B.

Example 11

A barrier film of Example 11 was produced by a process similar to that of Example 8, except that the deformation-withstanding barrier coat layer coating liquid E was used instead of the deformation-withstanding barrier coat layer coating liquid B.

Example 12

A barrier film of Example 12 was produced by a process similar to that of Example 8, except that the deformation-withstanding barrier coat layer coating liquid A was used instead of the deformation-withstanding barrier coat layer coating liquid B.

Example 13

A barrier film of Example 13 was produced by a process similar to that of Example 8, except that the deformation-withstanding barrier coat layer coating liquid F was used instead of the deformation-withstanding barrier coat layer coating liquid B.

Comparative Example 1

A barrier film of Comparative Example 1 was produced by a process similar to that of Example 8, except that the barrier coat layer coating liquid G was used instead of the deformation-withstanding barrier coat layer coating liquid B.

Comparative Example 2

A barrier film of Comparative Example 2 was produced by a process similar to that of Example 8, except that the barrier coat layer coating liquid H was used instead of the deformation-withstanding barrier coat layer coating liquid B.

Comparative Example 3

A barrier film of Comparative Example 3 was produced by a process similar to that of Example 8, except that the barrier coat layer coating liquid I was used instead of the deformation-withstanding barrier coat layer coating liquid B.

<Production of Barrier Packaging Material>

An unstretched polypropylene film (CPP GLC, manufactured by Mitsui Chemicals Tohcello, Inc.) having a thickness of 30 μm was prepared as a sealant layer, the sealant layer was laminated on each of the barrier films of Examples 8 to 13 and Comparative Examples 1 to 3 by dry lamination processing, the sealant layer being laminated on the barrier layer-formed surface side (barrier coat layer surface) of each of the gas barrier films, with a polyester urethane-based adhesive (TAKELAC A-525, manufactured by Mitsui Chemicals, Inc./TAKENATE A-52, manufactured by Mitsui Chemicals, Inc.) interposed therebetween, such that the deformation-withstanding barrier coat layer surface and the sealant layer faced each other, the assembly was cured (aged) at 40° ° C. for 48 hours, and barrier packaging materials of Examples 8 to 13 and Comparative Examples 1 to 3 were obtained.

<Evaluation of Barrier Films According to Examples 8 to 13>

[Evaluation of Oxygen Permeability and Water Vapor Permeability of Barrier Film]

For the barrier films according to Examples 8 to 13, measurement of the oxygen permeability and the water vapor permeability was carried out by methods similar to those used in Examples 1 to 7. The results are presented after the item "Before lamination" in Table 4. Furthermore, for the barrier packaging materials of Examples 8 to 13, the results of carrying out measurement of the oxygen permeability and the water vapor permeability by similar methods are presented after the item "After lamination" in Table 4.

[Evaluation of Bending Resistance]

Each of the barrier packaging materials according to Examples 8 to 13 was cut out into a size of 295 mm in length×210 mm in width to obtain samples. These samples were subjected to a flex test in the same manner as described above. For the samples after the flex test, the oxygen permeability and the water vapor permeability were measured according to the methods described above. The results are presented after the item "After flex test" in Table 4.

[Measurement of Lamination Strength]

Each of the barrier packaging materials according to Examples 8 to 13 was cut out into a strip form having a width of 15 mm, and the lamination strength was measured by subjecting the sample to 90° peeling at the interface between the gas barrier film and the sealant layer at a rate of 300 mm/min using a TENSILON Universal Material Testing Machine (manufactured by A & D Co., Ltd.). Measurement was carried out according to the peeling adhesive strength test method for T-type peeling (JIS K6854-3, ISO11339). The results are presented in Table 4. Incidentally, the peeling interface was recognized in between the base material film and the deformation-withstanding barrier coat layer in Examples 8 to 11. In Examples 12 and 13, the films ruptured during the measurement.

[Heat Seal Strength]

Two sheets of each of the barrier packaging materials according to Examples 8 to 13 were prepared. The two sheets of a barrier packaging material were superposed such that the sealant layers faced each other, and the assembly was heat-sealed using a heat sealer under the conditions of 160° C. and 0.2 MPa for 1 second. The sample after heat sealing was cut into a strip form having a width of 15 mm, and measurement of the heat seal strength was carried out according to the "Testing methods for heat-sealed flexible packages" described in JIS Z0238:1998. The measurement of the heat seal strength was carried out using a TENSILON Universal Material Testing Machine (manufactured by A & D Co., Ltd.) at a tensile rate of 300 mm/min. The results are presented after the item "Heat seal strength" in Table 4. Incidentally, the peeling interface was recognized in between the base material film and the deformation-withstanding barrier coat layer in Examples 8 to 11. In Examples 12 and 13, the films ruptured during the measurement.

carried out by a method similar to that of Examples 1 to 7 (measurement was made with the surface of the barrier coat layer arranged to face the sensor side (humidity 0% side)). The results are presented after the item "Before lamination 1" in Table 4. For the barrier films according to Comparative Examples 1 to 3, measurement of the water vapor permeability was carried out by arranging the surface of the barrier coat layer to face the high humidity side (humidity 90% side). The results are presented after the item "Before lamination 2" in Table 4.

<Evaluation of Barrier Packaging Materials According to Comparative Examples 1 to 3>

[Evaluation of Oxygen Permeability of Barrier Packaging Material]

For the barrier packaging films according to Comparative Examples 1 to 3, measurement of the oxygen permeability was carried out by a method similar to that used in Examples 1 to 7. The results are presented after the item "Before lamination" in Table 5.

[Evaluation of Water Vapor Permeability of Barrier Packaging Material]

For the barrier packaging films according to Comparative Examples 1 to 3, measurement of the water vapor permeability was carried out by a method similar to that used in Examples 1 to 7. The results are presented after the item "After lamination" in Table 5.

[Evaluation of Bending Resistance]

Each of the barrier packaging materials according to Comparative Examples 1 to 3 was cut out into a size of 295 mm in length×210 mm in width to obtain samples. These samples were subjected to a flex test in the same manner as described above. For the samples after the flex test, the oxygen permeability and the water vapor permeability were

TABLE 4

| | | Example | | | | | |
|---|---|---|---|---|---|---|---|
| | | 8 | 9 | 10 | 11 | 12 | 13 |
| Base material film | | PP | PP | PP | PP | PP | PP |
| Adhesiveness enhancing layer | | Present | Present | Present | Present | Present | Present |
| Inorganic oxide layer | | Present | Present | Present | Present | Present | Present |
| deformation-withstanding barrier coat layer | Thickness [μm] | 0.3 | 0.3 | 0.3 | 0.3 | 0.3 | 0.3 |
| | Content of PVA [mass %] | 65 | 75 | 77.5 | 80 | 85 | 95 |
| | Content of water-swellable mica [mass %] | 35 | 25 | 22.5 | 20 | 15 | 5 |
| Oxygen permeability [cm3/m² · day · atm] | Before lamination | 0.88 | 0.89 | 1.05 | 0.61 | 1.13 | 0.80 |
| | After lamination | 0.48 | 0.55 | 0.80 | 1.01 | 0.50 | 1.25 |
| | After flex test | 3.8 | 3.5 | — | — | 1.6 | 3.0 |
| Water vapor permeability [g/m2 · day] | Before lamination 1 | 0.15 | 0.15 | 0.14 | 0.15 | 0.11 | 0.13 |
| | Before lamination 2 | 0.58 | — | 0.47 | 0.39 | — | 0.83 |
| | After lamination | 0.12 | 0.10 | — | — | 0.09 | 0.10 |
| | After flex test | 0.60 | 0.80 | — | — | 0.34 | 0.53 |
| T-type peeling strength [N/15 mm] | | 0.35 | 1.10 | 1.85 | 2.20 | 2.75 | 3.30 |
| Heat seal strength [N/15 mm] | | 25.4 | 30.4 | 31.0 | 28.9 | 38.2 | 35.7 |

The symbol "—" in the table means that measurement was not achieved.

<Evaluation of Barrier Films According to Comparative Examples 1 to 3>

[Evaluation of Oxygen Permeability of Barrier Film]

For the barrier films according to Comparative Examples 1 to 3, measurement of the oxygen permeability was carried out by a method similar to that used in Examples 1 to 7. The results are presented after the item "Before lamination" in Table 5.

[Evaluation of Water Vapor Permeability of Barrier Film]

For the barrier films according to Comparative Examples 1 to 3, measurement of the water vapor permeability was measured according to the methods described above. The results are presented after the item "After flex test" in Table 5.

[Measurement of Lamination Strength]

Each of the barrier packaging materials according to Comparative Examples 1 to 3 was cut into a strip form having a width of 15 mm, and the T-type peeling strength and the 180° peeling strength were measured in the same manner as in Examples 1 to 7. The results are presented in Table 5.

[Heat Seal Strength]

Two sheets of each of the barrier packaging materials according to Comparative Examples 1 to 3 were prepared. The two sheets of a barrier packaging material were superposed such that the sealant layers faced each other, and the assembly was heat-sealed using a heat sealer under the conditions of 160° C. and 0.2 MPa for 1 second. The sample after heat sealing was cut into a strip form having a width of 15 mm, and measurement of the heat seal strength was carried out in the same manner as in Examples 1 and 7. The results are presented in Table 5.

TABLE 5

|  |  | Comparative Example | | |
|---|---|---|---|---|
|  |  | 1 | 2 | 3 |
| Base material film |  | PP | PP | PP |
| Adhesiveness enhancing layer |  | Present | Present | Present |
| Inorganic oxide layer |  | Present | Present | Present |
| Barrier coat layer | Thickness [μm] | 0.3 | 0.3 | 0.3 |
|  | Content of PVA [mass %] | 100 | 60 | 94 |
|  | Content of water-swellable mica [mass %] | 0 | 40 | 6 |
| Oxygen permeability | Before lamination | 1.5 | 0.90 | 0.80 |
| [cm$^3$/m$^2$ · day · atm] | After lamination | 1.22 | 0.33 | 0.30 |
|  | After flex test | 1.29 | 3.86 | 44.7 |
| Water vapor permeability | Before lamination 1 | 0.13 | 0.15 | 0.40 |
| [g/m$^2$ · day] | Before lamination 2 | 2.6 | 0.55 | — |
|  | After lamination | 0.09 | 0.13 | 0.30 |
|  | After flex test | 0.43 | 0.7 | — |
| Peeling strength | T-type peeling | 0.13 | 0.15 | — |
| [N/15 mm] | 180° peeling | 8.4 | 1.6 | — |
| Heat seal strength [N/15 mm] |  | 32.4 | 22.3 | — |

The symbol "—" in the table means that measurement was not achieved.

The barrier film according to Comparative Example 1, in which the barrier coat layer did not include water-swellable mica (inorganic lamellar mineral), had insufficient moisture resistance, and deterioration of barrier properties was recognized (see Before lamination 2). The barrier film according to Comparative Example 2, in which the content of the water-swellable mica in the barrier coat layer was 40% by mass, had insufficient T-type peeling strength.

INDUSTRIAL APPLICABILITY

According to the present disclosure, a barrier film that is useful for realizing excellent recyclability of the packaging material and has excellent gas barrier properties, and a barrier packaging material are provided.

REFERENCE SIGNS LIST 1, 11: base material film, 2, 2B, 12: barrier layer, 3A, 3B, 13: deformation-withstanding barrier coat layer, 4, 14: inorganic oxide layer, 5: adhesiveness enhancing layer, 10, 10A, 10B, 10C, 10D: barrier film, 20: adhesive layer, 30: sealant layer, 40: ink layer, 100: barrier packaging material.

The invention claimed is:

1. A barrier film, comprising:
    a base material film including a polyolefin-based resin;
    an inorganic oxide layer formed on one surface of the base material film; and
    a deformation-withstanding barrier coat layer formed on the inorganic oxide layer such that the deformation-withstanding barrier coat layer is in contact with the inorganic oxide layer,
    wherein the polyolefin-based resin of the base material film includes polyethylene such that the base material film has a coefficient of thermal shrinkage at 100° ° C. and 15 minutes of 2% or less in a first direction on a film plane and in a second direction orthogonal to the first direction, the deformation-withstanding barrier coat layer includes a hydroxyl group-containing polymer compound and water-swellable mica such that a content of the water-swellable mica in the deformation-withstanding barrier coat layer is in a range of 5 parts by mass to 35 parts by mass with respect to 100 parts by mass of a total mass of the deformation-withstanding barrier coat layer.

2. The barrier film according to claim 1, wherein the content of the water-swellable mica in the deformation-withstanding barrier coat layer is less than 20 parts by mass.

3. The barrier film according to claim 1, wherein the polyolefin-based resin is polyethylene.

4. The barrier film according to claim 1, wherein the base material film comprises a multilayer film such that the multilayer film includes a core layer comprising a high-density polyethylene.

5. The barrier film according to claim 1, wherein the base material film includes a layer comprising a high-density polyethylene.

6. The barrier film according to claim 1, wherein the base material film has a coefficient of thermal shrinkage at 80° C. and 15 minutes of 1% or less in the first direction on the film plane and in the second direction orthogonal to the first direction.

7. The barrier film according to claim 1, wherein the base material film has a coefficient of thermal shrinkage at 120° C. and 15 minutes of 5% or less in the first direction on the film plane and in the second direction orthogonal to the first direction.

8. The barrier film according to claim 1, the inorganic oxide layer includes silicon oxide.

9. The barrier film according to claim 1, further comprising:
    an adhesiveness enhancing layer formed between the base material film and the inorganic oxide layer.

10. The barrier film according to claim 1, wherein the hydroxyl group-containing polymer compound of the deformation-withstanding barrier coat layer includes a polyvinyl alcohol resin.

11. The barrier film according to claim 1, wherein the content of the water-swellable mica in the deformation-withstanding barrier coat layer is in a range of 7 parts by mass to 30 parts by mass with respect to 100 parts by mass of a total mass of the deformation-withstanding barrier coat layer.

12. The barrier film according to claim 1, wherein the content of the water-swellable mica in the deformation-withstanding barrier coat layer is in a range of 10 parts by mass to 20 parts by mass with respect to 100 parts by mass of a total mass of the deformation-withstanding barrier coat layer.

13. The barrier film according to claim 1, wherein the content of the water-swellable mica in the deformation-withstanding barrier coat layer is in a range of 12 parts by mass to 17 parts by mass with respect to 100 parts by mass of a total mass of the deformation-withstanding barrier coat layer.

14. The barrier film according to claim 1, wherein the hydroxyl group-containing polymer compound of the deformation-withstanding barrier coat layer includes a polyvinyl alcohol resin having a degree of saponification of 95% or more.

15. The barrier film according to claim 14, wherein the content of the water-swellable mica in the deformation-withstanding barrier coat layer is less than 20 parts by mass.

16. The barrier film according to claim 14, wherein the content of the water-swellable mica in the deformation-withstanding barrier coat layer is in a range of 7 parts by mass to 30 parts by mass with respect to 100 parts by mass of a total mass of the deformation-withstanding barrier coat layer.

17. The barrier film according to claim 14, wherein the content of the water-swellable mica in the deformation-withstanding barrier coat layer is in a range of 10 parts by mass to 20 parts by mass with respect to 100 parts by mass of a total mass of the deformation-withstanding barrier coat layer.

18. The barrier film according to claim 14, wherein the content of the water-swellable mica in the deformation-withstanding barrier coat layer is in a range of 12 parts by mass to 17 parts by mass with respect to 100 parts by mass of a total mass of the deformation-withstanding barrier coat layer.

19. A barrier packaging material, comprising:
the barrier film of claim 1; and
a sealant layer including a polyolefin-based resin.

20. A barrier packaging material, comprising:
the barrier film of claim 7; and
a sealant layer including a polyolefin-based resin.

* * * * *

UNITED STATES PATENT AND TRADEMARK OFFICE
CERTIFICATE OF CORRECTION

| | | |
|---|---|---|
| PATENT NO. | : 12,083,774 B2 | |
| APPLICATION NO. | : 17/633538 | |
| DATED | : September 10, 2024 | |
| INVENTOR(S) | : Shukiko Imaizumi et al. | |

It is certified that error appears in the above-identified patent and that said Letters Patent is hereby corrected as shown below:

On the Title Page

Item (60), the Related U.S. Application Data has been omitted. Item (60) should read:
-- Related U.S. Application Data
(60) Provisional Application No. 62/884,759 filed on Aug. 9, 2019 --

Signed and Sealed this
Twenty-second Day of October, 2024

Katherine Kelly Vidal
*Director of the United States Patent and Trademark Office*